(12) United States Patent
Schmidt et al.

(10) Patent No.: US 9,222,789 B2
(45) Date of Patent: Dec. 29, 2015

(54) WAYFINDING METHOD AND DEVICE

(71) Applicant: GM GLOBAL TECHNOLOGY OPERATIONS LLC, Detroit, MI (US)

(72) Inventors: Gerald Schmidt, Frankfurt am Main (DE); Harald Berninger, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/341,615

(22) Filed: Jul. 25, 2014

(65) Prior Publication Data

US 2015/0032369 A1   Jan. 29, 2015

(30) Foreign Application Priority Data

Jul. 25, 2013   (DE) .......................... 10 2013 012 324

(51) Int. Cl.
*G01C 19/70* (2006.01)
*B60Q 5/00* (2006.01)
*G01C 21/34* (2006.01)
*B60Q 9/00* (2006.01)

(52) U.S. Cl.
CPC . *G01C 21/34* (2013.01); *B60Q 9/00* (2013.01)

(58) Field of Classification Search
CPC .................................. G01C 21/34; B60Q 9/00

USPC ........................................................... 701/467
See application file for complete search history.

(56) References Cited

U.S. PATENT DOCUMENTS

| 8,380,426 | B2 * | 2/2013 | Konijnendijk | 701/301 |
|---|---|---|---|---|
| 8,687,063 | B2 * | 4/2014 | Hsieh et al. | 348/148 |
| 2002/0095246 | A1 * | 7/2002 | Kawazoe | 701/1 |
| 2005/0187684 | A1 * | 8/2005 | Hijikata et al. | 701/45 |
| 2009/0125204 | A1 | 5/2009 | Kudo | |
| 2009/0167560 | A1 * | 7/2009 | Becker | 340/903 |
| 2009/0192710 | A1 * | 7/2009 | Eidehall et al. | 701/301 |
| 2009/0284597 | A1 * | 11/2009 | Nakamori et al. | 348/148 |

FOREIGN PATENT DOCUMENTS

| DE | 102005029662 A1 | 1/2006 |
|---|---|---|
| DE | 102006038018 A1 | 2/2008 |
| DE | 102010007240 A1 | 8/2011 |

OTHER PUBLICATIONS

Machine Translation of DE102005029662, Schlingelhof Marius, WIPO, Jan. 19, 2006.*

* cited by examiner

*Primary Examiner* — Mary Cheung
*Assistant Examiner* — Frederick Brushaber
(74) *Attorney, Agent, or Firm* — Ingrassia Fisher & Lorenz PC

(57) ABSTRACT

An automatic wayfinding method for an ego or first vehicle is disclosed. The method includes receiving position information transmitted by at least one lead vehicle and constructing a route based on the received position information.

10 Claims, 1 Drawing Sheet

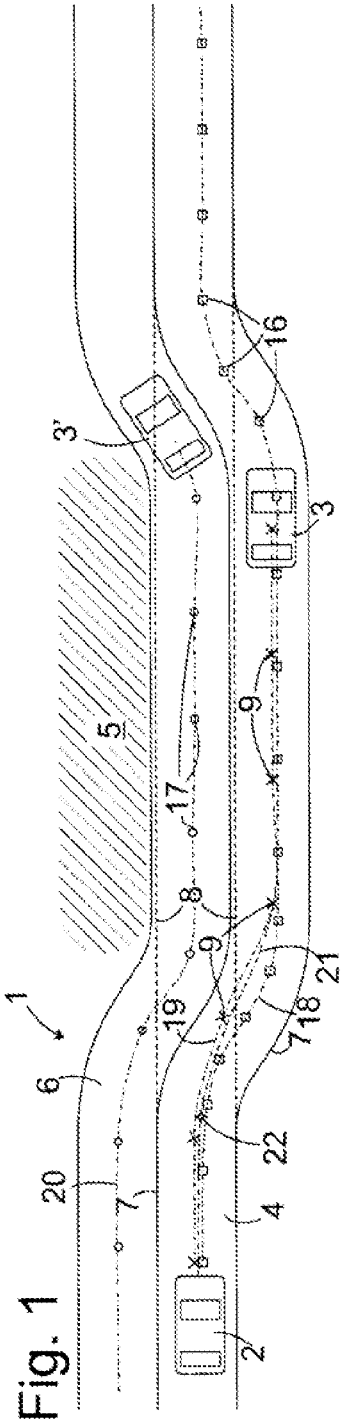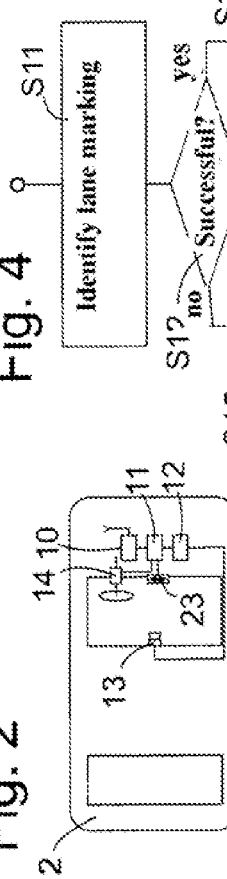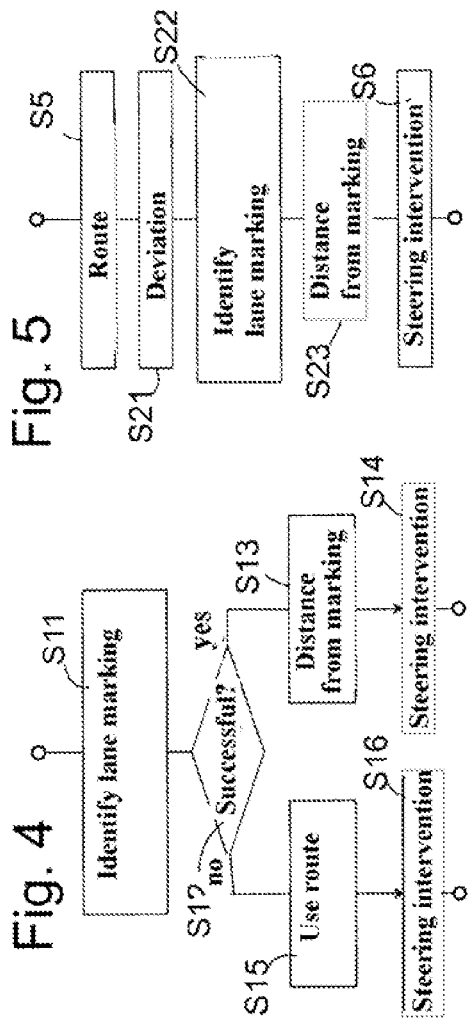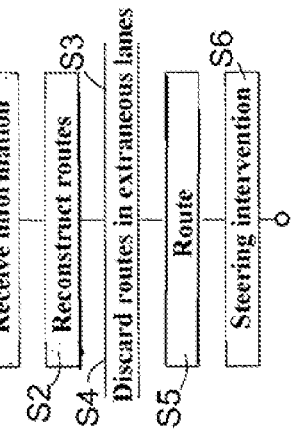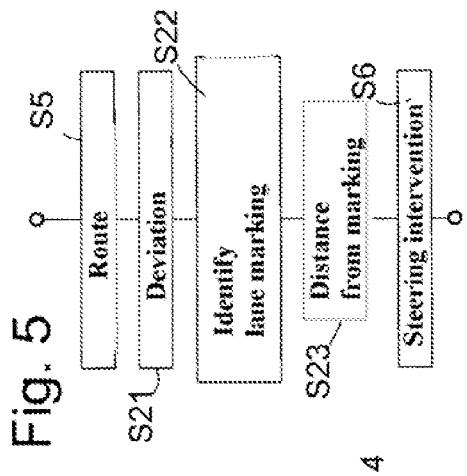

WAYFINDING METHOD AND DEVICE

CROSS REFERENCE TO RELATED APPLICATION

This application claims priority to German Patent Application No. 102013012324.0 filed Jul. 25, 2013, which is incorporated herein by reference in its entirety.

TECHNICAL FIELD

The technical field relates to an automatic wayfinding method for a vehicle and a driver assistance system for implementing such a method.

BACKGROUND

Modern motor vehicles make use of driver assistance systems, which detect a lane boundary, such as a median or shoulder, by means of a camera arranged on the vehicle, and warn the driver if the vehicle gets critically close to the edge of the lane or even drives over it. These assistance systems experience difficulty in performing their task when the lane boundary is missing, fragmented or very dirty, or when temporary and permanent lane markings are present simultaneously (e.g., in a construction zone) and only the temporary lane markings are to be considered.

US 2009/0125204 A1 described a driver assistance system in which a vehicle here referred to as an ego or first vehicle combines and evaluates the information of a lane detection system and information from a camera that acquires an image of the lead vehicles, so as to influence the steering of the first vehicle based on the combined information.

It is logical for the first vehicle to orient itself toward a vehicle ahead of the first vehicle, since its driver and/or assistance systems can better recognize the lane boundaries on a road segment ahead than the first vehicle or its driver, and hence have a head start over the latter in terms of recognition. If a vehicle ahead, referred to herein as the second or lead vehicle is driving "correctly" in that it keeps a reasonable distance from the lane boundaries and maintains a reasonable speed reflecting the curve radii of the lane, the first vehicle is also driving correctly when it follows the route of the lead vehicle at the same speed. However, there is no guarantee in practice that the lead vehicle is driving correctly, and errors or inaccuracies in evaluating the images delivered by the camera can also result in deviations between the actual position of the lead vehicle and the position acquired by the first vehicle. The further the distance between the ego vehicle and the vehicle ahead, the greater such errors become. Therefore, the greater the head start of the lead vehicle in terms of recognition, the less useful it becomes. Poor visibility conditions such as those produced by a darkly reflective, rainy road can detract from the detection of both the lead vehicle and the lane boundaries. It is precisely in critical situations where there is no visual contact, e.g., when a lead vehicle has disappeared behind a curve, that the conventional method yields no usable information. As a consequence, it does not make sense for the first vehicle to be excessively oriented toward the path traveled by the lead vehicle.

SUMMARY

One embodiment of the present disclosure provides an automatic wayfinding method and a driver assistance system for automatic wayfinding that is able to use a lead vehicle for gathering information without relying upon a line of sight with the lead vehicle or an optical measurement of the distance between the lead vehicle and first vehicle. In this embodiment an automatic wayfinding method includes receiving position information transmitted by at least one lead vehicle (step a); and constructing a route based on the received position information (step b). While vehicles usually transmit information about their own position within the framework of V2V communication, use can be made of position information transmitted according to whatever other communication standards desired.

The position information transmitted by lead vehicles denote locations that the first vehicle might also pass through on its continuing journey, and is therefore suitable as the basis for constructing a route for the first vehicle. The position information received by the first vehicle can originate from several lead vehicles, and thus belong to various routes. Nonetheless, this position information can be jointly processed by calculating a best-fit curve in order to construct a route for the first vehicle from this position information.

It is also logical to allocate the received position information to a respective transmitting vehicle. This provides the capability of checking whether the vehicle transmitting the position information is even traveling on the same route as the first vehicle, and to discard the position information of vehicles that are not. In particular, constructing a route as mentioned above can involve reconstructing the route of at least one lead vehicle. The reconstructed route can be used to easily check whether a lead vehicle is even driving on the same lane as the first vehicle. This makes sense in particular if the first vehicle is traveling on a multilane road, and position information can be received from vehicles that are driving in an adjacent lane in the same direction of the first vehicle.

Once the reconstructed routes of several lead vehicles are available, they can be used to construct an improved route for the first vehicle. As a result, a driving error by a single lead vehicle manifested in a local deviation in the route of this vehicle from that of another lead vehicle has only a slight influence on the improved route.

The method can further encompass steering the first vehicle along the reconstructed route (step c) and include detecting environment information, in particular optical, radar or other picture information, which, if visible or present, reveals the position of a lane marking relative to the first vehicle (step d); and determining the position of the first vehicle relative to the lane marking based on the environment information and reconstructed route (step e). The first vehicle is steered at a prescribed distance from the lane marking or an indicating signal is output when the distance between the first vehicle and lane marking lies outside a permissible range.

This further development is based on the assumption that lead vehicles will also be trying to maintain a proper distance from the lane marking, and that the probability that a given element in a picture represents the lane marking is especially high if it is located at such a proper distance from the lead vehicle. This makes it possible to improve the reliability with which the distance between the position of the first vehicle and the lane marking is determined.

The certainty that the constructed route is suitable increases as a function of the number of lead vehicles whose position information went into its determination. For this reason, the weight given to the constructed route when determining the position in step e increases by comparison to the environment information as does the number of lead vehicles based upon which the route is constructed. The information obtained in this way can be used to either directly steer the first vehicle, or to assist the driver in steering, by generating the indicating signal when necessary.

An alternative further development of the method involves acquiring environment information (step d'); and determining the position of the first vehicle relative to a lane marking based on the environment information (step e'). The step of steering based on the reconstructed route is only executed when step e' fails. In other words, whenever the lane marking is unrecognizable or absent, the route constructed as described above is drawn upon to steer the first vehicle.

The higher the number of vehicles used to determine the constructed route, the greater the certainty that a lane marking, if present, must be situated at a proper distance from this route as well. The decision as to whether step e or step e' has failed, in particular the decision as to whether the lane marking was successfully recognized, can best depend on the number of lead vehicles based upon which the route is constructed, since the greater the certainty that the route reflects the actual course of the lane, the more accurately where the lane marking should be located can also be predicted based on the route.

The subject matter of the present disclosure also relates to a device for implementing the method described above, and in particular to a driver assistance system which is configured to receive position information for at least one lead vehicle and construct a route based on the received position information, preferably based on a best-fit curve from the position information for several lead vehicles. The device is further configured to allocate the received position information to each vehicle that transmits it, and discard the position information for a vehicle traveling on a different lane than the first vehicle. As an alternative, the system configured to construct the route can be configured to reconstruct the route of at least one lead vehicle. The system may further be configured to steer the first vehicle along the constructed route.

Alternatively, the device may be configured to acquire environment information, determine the position of the first vehicle relative to a lane marking based on the environment information and constructed route, steer the first vehicle at a prescribed distance from the lane marking; or output an indicating signal when the distance from the lane marking lies outside a permissible range.

Determining the position of the first vehicle can be configured in such a way that the weight given to the constructed route increases by comparison to the environment information as does the number of lead vehicles based upon which the route is constructed.

As a further alternative, the device can be configured to acquire environment information, and determine the position of the first vehicle relative to a lane marking based on the environment information. The first vehicle is then steered along the constructed route are used if the step of determining the first vehicle has failed. This determination can be made this decision depending on the number of lead vehicles based upon which the route is constructed. The position information can be received by a V2V radio interface. In addition, the system can exhibit an environment sensor, in particular a camera, for acquiring environment information. Finally, the process of steering the vehicle can be present, or an indicating signal generator can be provided so as to prompt the driver to take a steering action based on an assessment by the driver assistance system.

The subject matter of the present disclosure further relates to a computer program product that encompasses instructions, which when executed on a computer allow it to implement the method described above or operate as driver assistance system as described above. Another subject matter of the present disclosure relates to a non-transitory computer readable medium, on which are recorded program instructions that allow a computer to operate in the way indicated above.

BRIEF DESCRIPTION OF THE DRAWINGS

Additional features and advantages of the present disclosure may be gleaned from the following description of exemplary embodiments, drawing reference to the attached figures.

FIG. 1 is a typical traffic situation in which the present disclosure can be applied;

FIG. 2 is a block diagram of a vehicle equipped according to the present disclosure;

FIG. 3 is a flowchart for a method implemented by the driver assistance system of the vehicle from FIG. 2;

FIG. 4 is a flowchart for the method according to a further development of the present disclosure; and FIG. 5 is a flowchart for the method according to a second further development of the present disclosure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 illustrates a typical application situation of the present disclosure based on a top view depicting a multilane road 1 and two vehicles 2, 3 that are traveling in a right lane 4 of the road in the same direction, to the right on FIG. 1. The road 1 passes by a construction zone 5. In order to circumvent this construction zone, the right lane 4 and a left lane 6 of the road 1 are shifted to the side at the height of the construction zone 5. Lane markings 7 represented by a solid line on the figure show the current, shifted course of the lanes 4, 6. If the construction zone 5 were not there, the lanes 4, 6 would run straight through. Lane markings 8 represented by dashed lines on the figure show this course of the lanes 4, 6. While the lane markings 8 are not valid in the presence of the construction zone 5, they are still visible on the road surface. A driver approaching the construction zone 5 in vehicle 2, hereinafter referred to as the first vehicle, may experience difficulty under conditions of poor visibility telling the valid lane marking 7 apart from the invalid one 8. A driver assistance system of the ego or first vehicle 2 would have the same difficulty if it only had pictures of the road 1 taken by the camera for detecting the lane markings 7, 8.

The second or lead vehicle 3 driving ahead of the first vehicle 2 is capable of V2V communication, i.e., it routinely transmits information by radio in a standardized format about its current position and various other pieces of information that that other V2V-enabled vehicles in the vicinity might need, in particular to avoid collisions with the transmitting vehicle or improve traffic safety in some other way. A series of locations to which the lead vehicle 3 has already transmitted such information while driving by are denoted with crosses 9 on FIG. 1.

In order to receive this information from the lead vehicle 3, the first vehicle 2 encompasses a V2V radio interface 10, as shown on FIG. 2 based on a block diagram. A control unit 11 is connected on the one hand to the radio interface 10, and on the other hand by way of an image evaluation unit 12 to a camera 13, which is pointed at the road lying ahead of the first vehicle 2 so as to acquire the lane markings 7 and/or 8 and lead vehicles, such as the lead vehicle 3. The control unit 11 uses the data supplied by the radio interface 10 and image evaluation unit 12 to actuate a power steering device 14 in the first vehicle 2. The intervention by the control unit 11 in the power steering device 14 can involve an actuator of the power steering device 14 controlled by the control unit 11 directly adjusting the steering angle of the front wheels of the first vehicle 2. The steering intervention is preferably confined to control the resistance experienced by the driver when turning a steering wheel 15 in such a way that the force which the driver has to exert on the steering wheel 15 to steer the first vehicle 2 along a route favored by the control unit 11 is less than the force required to steer onto a route deviating from it.

Instead of the power steering 14, the control unit 11 can also actuate an indicating signal generator 23 in the dashboard of the first vehicle 2, which signals the driver whether and in what direction he or she must turn the steering wheel 15 to follow the route favored by the control unit 11.

FIG. 3 presents a flowchart for an operating procedure of the control unit 11 according to a first embodiment. In step S1, information is received from neighboring vehicles, e.g., the lead vehicle 3, about their current position. Based on information about the identity of the lead vehicle 3 sent along with the position information, the received information is allocated to the vehicles from which it originated in step S2. While steps S1, S2 are repeated several times over, the control unit 11 generates lists of locations where the various lead vehicles whose radio signals it receives have been were or currently are. The locations 9 indicated by the lead vehicle 3 are each symbolized by crosses, with squares denoting locations 16 where a vehicle has been but has already left the depicted section of road 1, and circles depicting the locations 17 of a vehicle 3' traveling in the left lane 6.

The control unit 11 reconstructs the routes 18, 19, 20 of the different vehicles 3, 3' driving ahead of the first vehicle 2 by interconnecting the respective locations 9, 16 and 17 that trace back to the same vehicle, e.g., with splines, as denoted on FIG. 1 by dot-dashed lines.

Based on the fact that the first traveling vehicle 2 never comes closer than the width of one lane to the route 20 of the lead vehicle 3', the control unit 11 recognizes that this vehicle 3' is extraneous to this lane, i.e., it is moving along a different lane than that of vehicle 2. The locations 17 traced back to the lead vehicle 3' are eliminated as irrelevant in step S4. The remaining locations 9 and 16 are used in step S5 to construct a route 21 for the first vehicle 2 on which the first vehicle 2 could travel the section of road depicted without leaving its lane 4. The route 21 can be constructed in step S5 by averaging the coordinates for routes 18, 19. Alternatively, the route 20 for the first vehicle 2 could also be constructed based directly on locations 9, 17, without resorting to the routes 18, 19, for example as the best-fit curve in which the sum of squared deviations between the best-fit curve and points 9 and 17 is minimal, similarly to the known least squares method.

The control unit 11 subsequently compares the position of the first vehicle 2 with the route 21 constructed in step S5, and, if the determined position deviates significantly from the route 21, takes corrective action on the steering mechanism or actuates an indicating display instrument to alert the driver that a steering correction is necessary in step 6.

FIG. 4 presents a flowchart for an operating procedure of the control unit 11 according to a further developed embodiment. In step S11, the image evaluation unit 12 receives a picture from the camera, and tries to identify the valid lane marking 7 therein. The image evaluation unit 12 can decide S12 whether the identification was successful. In this case, the control unit 11 is supplied with information about the distance of the first vehicle 2 from the identified lane marking, as well as about the success or failure of the identification. A quantitative indication as to the probability that the lane marking was correctly identified could also be transmitted, based upon which the control unit 11 arrives at a decision S12 about whether the identification succeeded or failed. For example, this probability estimate can be readily obtained by having the image evaluation unit 12 use a Kalman filter to identify the lane marking.

If the lane marking was successfully identified, the determined distance of the first vehicle 2 from the lane marking is used in step S13 to decide whether a steering intervention is required to adjust this distance to a desired value and, if necessary, this intervention is performed or the driver is prompted by a respective indicating signal to perform it in step S14. By contrast, if the lane marking was not successfully identified, whether because no lane marking is present at the current location of the first vehicle 2 or the image evaluation unit 12 cannot decide which of the two simultaneously visible markings 7, 8 is the right one, the route 21 is drawn upon in step S15 to decide whether the steering intervention is necessary based on a deviation of the first vehicle 2 from the route 21 as described as step S6 above, and then to perform the latter or prompt the driver to perform it (S16). In order for a current route 21 to be immediately available if needed, the steps S1 to S5 described with reference to FIG. 3 also take place in an endless loop in the control unit 11 parallel to the method on FIG. 4.

In a further development of this method, the fact that the route 21 is computationally updated continuously and thus available at any time can already be used in deciding whether the lane marking was successfully identified in step S12. As readily apparent, the certainty that the route 21 constructed in step S5 is usable will rise as the number of lead vehicles 3 ahead utilized as the basis for constructing the route 21 increases and/or the locations 9, 16 reported by these vehicles 3 become more densely distributed. Therefore, this further development also entails evaluating the certainty of the calculated route 21 while recalculating the route 21 in step S5, wherein the greater this certainty is, the higher the probability limit that must have been exceeded in step S12 to regard the lane marking as having been successfully identified is set.

Another approach is taken in the flowchart on FIG. 5. After each recalculation of the route 21 in S5, the deviation of the position of the first vehicle 2 from the route 21 is calculated (S21). This deviation is then used during image evaluation S22 to achieve a greater certainty in identifying the lane marking 7. For example, if the first vehicle 2 on FIG. 1 has reached a location 22 at which both lane markings 7, 8 are visible to the camera 13, the control unit 11 can use the current distance between the first vehicle 2 and markings 7, 8 and the deviation in the current position of the first vehicle 2 from the route 21 to estimate the distance that would exist between the markings 7, 8 and the first vehicle 2 were the latter to be on the route 21. The valid marking should then be located at a proper distance from the first vehicle 2. If the marking 7 is detected at this distance, it is identified as a valid marking, and a picture element that looks like it could be depicting a lane marking, but is not spaced the proper distance away from the first vehicle 2, such as the picture of the marking 8, is discarded. The actual distance between the first vehicle 2 and lane marking 7 identified in this way is subsequently estimated (S23) as in step S13, so that any required steering intervention can be performed to bring the vehicle to the proper distance from the lane marking 7 (S24).

The certainty of the route 21 can also be taken into account in this embodiment, in that the extent of similarity with a lane marking that an object acquired in a picture taken with the camera 13 must have to be recognized as a lane marking by the image evaluation unit 12 can decrease as the certainty of the route 21 increases if it is located a proper distance from the route 21, or must increase as does the certainty of the route 21 if it is not located at a proper distance.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An automatic wayfinding method for a first vehicle comprising:
   receiving position information transmitted by at least one vehicle ahead;
   constructing a route for the first vehicle based on the received position information, by:
      acquiring environment information;
      determining the position of the first vehicle relative to a lane marking based on the environment information and the constructed route;
      steering the first vehicle at a prescribed distance when the distance from the lane marking lies within a permissible range; and
      outputting an indicating signal when the distance from the lane marking lies outside the permissible range; and
   steering the first vehicle along the constructed route;
   wherein a weighting given to the constructed route by comparison to the environment information is increased as the number of vehicles ahead used to construct the route increases.

2. The method according to claim 1, wherein constructing a route comprises calculating a best-fit curve from the position information for a plurality of vehicles ahead.

3. The method according to claim 2, further comprising identifying at least one vehicle ahead from the plurality of vehicles ahead travelling on a different lane that the first vehicle, and discarding the received position information for the at least one vehicle ahead traveling on a different lane than the first vehicle.

4. The method according to claim 3, further comprising reconstructing an improved route of at least one vehicle ahead after discarding the received position information.

5. The method according to claim 4, further comprising:
   reconstructing a plurality of routes for a respective plurality of vehicles ahead of the first vehicle;
   wherein the improved route is reconstructed based on the reconstructed plurality of routes.

6. An automatic wayfinding method for a first vehicle comprising:
   receiving position information transmitted by at least one vehicle ahead;
   constructing a route for the first vehicle based on the received position information, by:
      acquiring environment information;
      determining the position of the first vehicle relative to a lane marking based on the environment information; and
      reconstructing an improved route of at least one vehicle ahead when the prior position determining step has failed; and
   steering the first vehicle along the constructed route, the improved route comprising the constructed route.

7. The method according to claim 6, wherein the decision as to whether the position determining step has failed is a function of the number of vehicles ahead based upon which the route is constructed.

8. An automatic wayfinding driver assistance system for a first vehicle comprising:
   a receiver configured to receive position information for at least one vehicle ahead;
   a controller configured to construct a route based on the received position information; by:
      acquiring environment information;
      determining the position of the first vehicle relative to a lane marking based on the environment information; and
      reconstructing an improved route of least one vehicle ahead when the prior position determining step has failed; and
   steering the first vehicle along the constructed route, the improved route comprising the constructed route.

9. The driver assistance system according to claim 8, wherein the receiver comprises a V2V radio interface.

10. The driver assistance system according to claim 8 further comprising an environment sensor configured to acquire environment information.

* * * * *